(No Model.)  2 Sheets—Sheet 1.

G. S. BAKER.
MACHINE FOR BAKING SUGAR WAFER CAKES, &c.

No. 353,837. Patented Dec. 7, 1886.

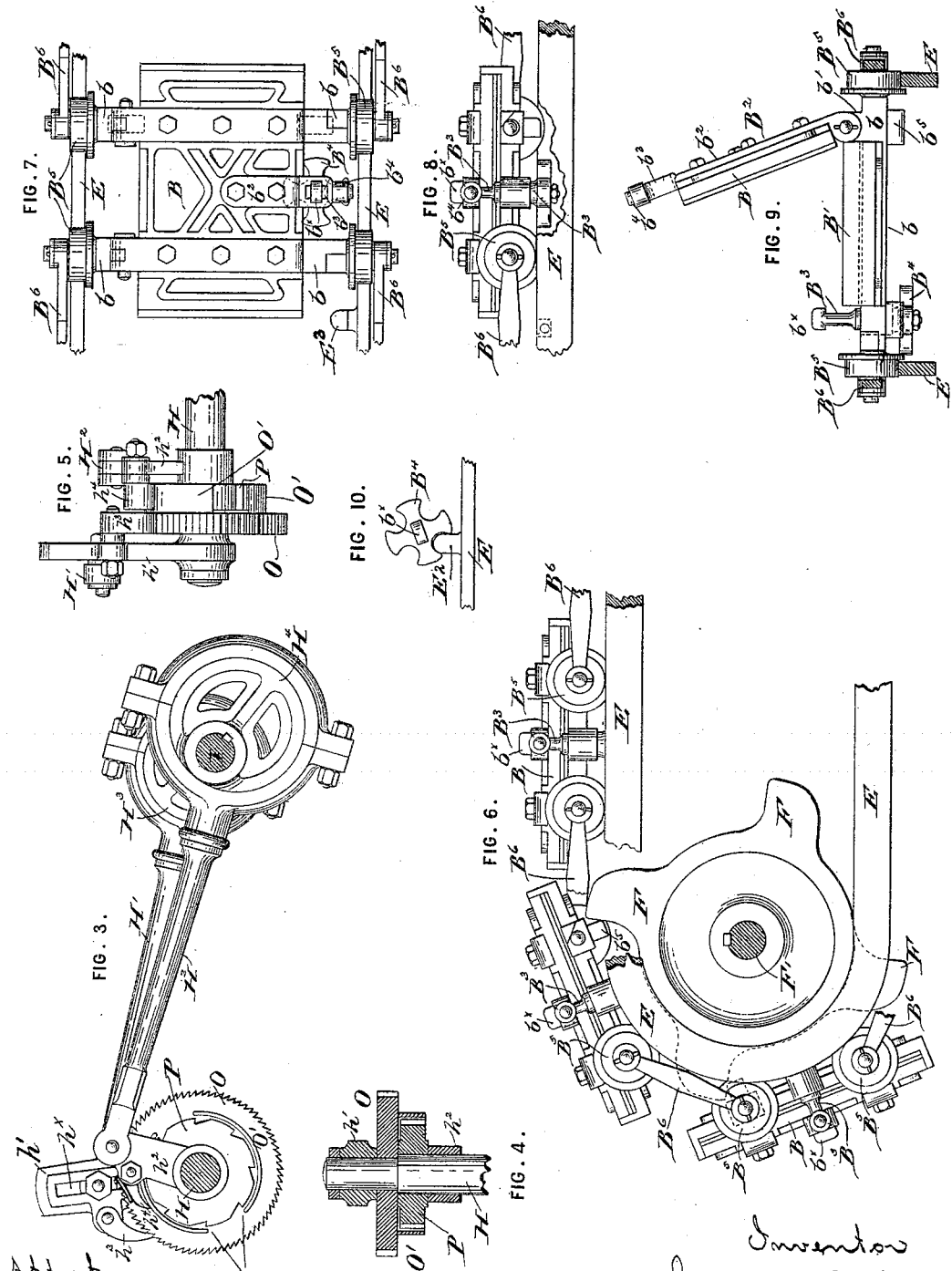

United States Patent Office.

GEORGE SAMUEL BAKER, OF LONDON, ENGLAND.

MACHINE FOR BAKING SUGAR-WAFER CAKES, &c.

SPECIFICATION forming part of Letters Patent No. 353,537, dated December 7, 1886.

Application filed November 17, 1885. Serial No. 183,091. (No model.) Patented in England October 6, 1885, No. 11,899; in France November 20, 1885, No. 172,408; in Italy November 23, 1885, No. 19,131, XIX; in Austria-Hungary December 4, 1885, No. 44,123 and No. 5,033, and in Germany January 19, 1886, No. 36,565.

*To all whom it may concern:*

Be it known that I, GEORGE SAMUEL BAKER, a subject of the Queen of Great Britain, residing at London, England, have invented a certain new and useful Improvement in Machines for Baking Sugar-Wafer Cakes and the like, (for which I have obtained Letters Patent in Great Britain, No. 11,899, dated October 6, 1885; in France, No. 172,408, dated November 20, 1885; in Germany, No. 36,565, dated January 19, 1886; in Austria-Hungary, Nos. 44,123, 5,033, dated December 4, 1885; and in Italy, No. 19,131, dated November 23, 1885;) and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

Figure 1:
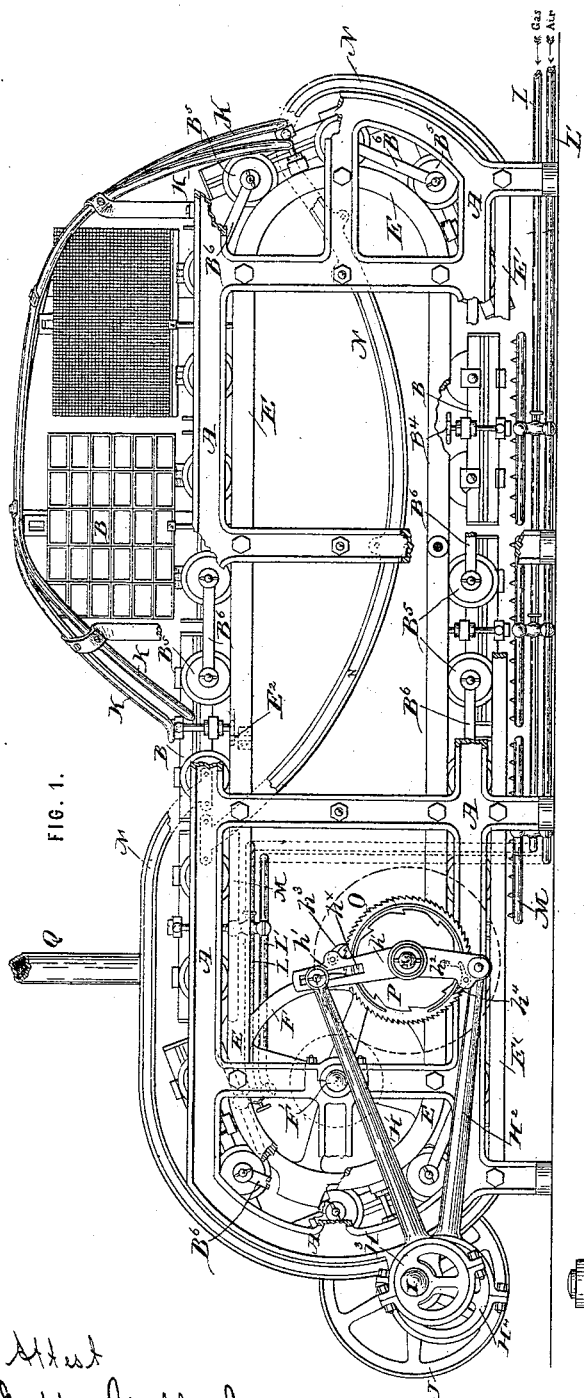
Figure 2:
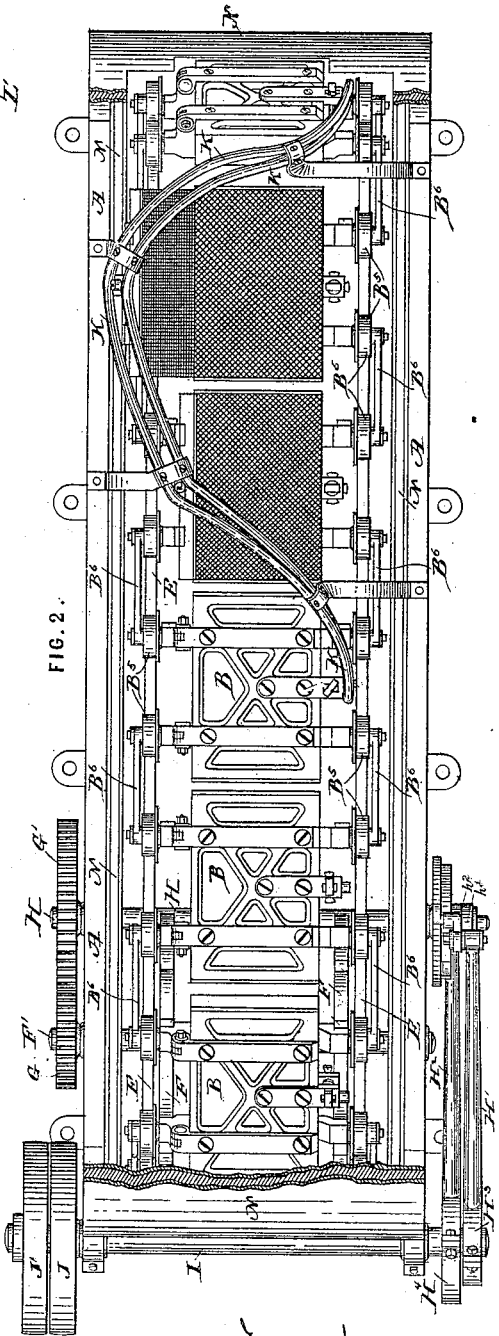

Referring to the drawings, Figure 1 shows my improved machine by a side elevation, the inclosing-case and part of the frame-work being removed to show the operating devices thereof. Fig. 2 is a top plan view with the greater part of the inclosing-case removed. Fig. 3 is a side elevation illustrating the driving mechanism for the forms or baking-pans. Fig. 4 is a sectional detail view, and Fig. 5 an end elevation thereof. Fig. 6 is a detached detail view of a portion of the endless baking forms or frames and the driving-shaft and wheel therefor, one of the guide-rails only being shown. Fig. 7 is a top plan view of one of the baking pans or forms and a portion of the track, showing the lug or stop $E^3$, that rotates the locking-bolt of the pan-lids to unlock the latter. Fig. 8 is a side elevation of one of the baking forms or frames and one of the guide-rails. Fig. 9 is an end view of one of the baking forms or frames with the lid or cover thrown open; and Fig. 10 is a detail view showing a portion of one of the guide and carrier rails and the stud or lug $E^2$, that engages the star-wheel of the locking-bolts for the pan-lids to lock the latter.

This invention has for its object to provide a machine for baking sugar-wafers and the like, which shall be as nearly as possible automatic in all its operations, and therefore require but little attention, and will for yielding its full effect require but two attendants, although but a single one would suffice to work the machine at a slower rate.

The invention consists in certain novel features of construction, substantially as hereinafter fully described, and as set forth in the claims.

In the drawings, A indicates the main framing of the machine, which is inclosed in a double-walled jacket or inclosing-casing, N, provided with a filling of any suitable material that is a non-conductor of heat.

B B indicate the baking pans or forms or irons. (More plainly shown in Figs. 6, 7, 8, and 9, the lid of the pan in the latter figure being shown as thrown open.) These pans or irons consist of the pan proper, B', fitted on two cross-bars, $b$, that have vertical lugs $b'$, to which is hinged the lid or cover $B^2$. From the center of the lid projects a strap, $b^2$, that has a slot, $b^3$, and at the end of said strap is formed a stud, $b^4$, for purposes presently described.

In a boss or bracket projecting from the pan B is pivotally secured a vertical locking-bolt, $B^3$, that has a T-head, $b^\times$, adapted to pass through the slot $b^3$ of the locking-strap $b^2$ when said bolt is in proper position, so that the head thereof will register with said slot. At its lower end the locking bolt or pin $B^3$ carries a star-wheel, $B^4$, by means of which and mechanism presently to be described the bolt is actuated to lock or unlock the lid $B^2$ to or from the pan B'. The cross-bars $b$ have trunnions for the carrying-wheels $B^5$.

The pans constructed as described are connected in an endless series by means of links $B^6$, that connect the rear and front trunnions respectively of two successive pans, as more plainly shown in Fig. 6, the said links forming an endless chain with the pans.

From the under side of the rear cross-bar, $b$, projects a lug or shoulder, $b^5$, Figs. 6 and 9, upon which impinges the teeth of two sprocket or pitch wheels, F, one for each side of the chain of pans B.

E and E' are guide rails or tracks upon which the pans travel, and by which they are guided. The guide-rails E extend along the frame and its ends and form endless tracks, while the guide-rails E' extend only the length of the frame A, at the bottom thereof, and partially around its curved ends, so that when the pans travel along the lower part of the machine they are guided by two rails or tracks—one above the other—below the wheels B⁵.

If desired, the wheels B⁵ on the pan-carriage may be dispensed with and friction-rolls secured to the tracks, and the same result obtained.

The pitch-wheels F, for propelling the chain of pans along the tracks E E', are mounted on a shaft, F', that has its bearings in the framing of the machine, and carries at its outer end, outside of the inclosing jacket or case N, a gear-wheel, G, that meshes with a like wheel, G', on the outer end of a shaft, H. The latter shaft carries a ratchet-gearing, by means of which an intermitting movement is imparted to the shaft F', and through the latter to the chain of pans, the said shaft H being driven from the main driving-shaft I, at one end of the machine, through the ratchet-gearing, which is of novel and peculiar construction.

H' and H² are two eccentric-rods, driven respectively by eccentrics H³ H⁴ on the main driving-shaft I, which also carries the usual belt-pulleys, J J'. The eccentric-rod H', which is driven by the smaller eccentric, H³, is connected to a slotted arm, h', that is pivoted or loosely mounted on shaft H, the amplitude of the throw of said rod H' being adjusted by means of the slots h×, Figs. 1 and 3.

Upon the arm h' is pivoted a pawl, h³, which engages with the teeth of a ratchet-wheel, O, which is loosely mounted on shaft H, and imparts to said ratchet-wheel a slow step-by-step rotation.

From one face of the ratchet-wheel O projects a collar, O', within which is arranged a ratchet-wheel, P, that has a considerably less number of teeth than the ratchet-wheel O, and in said collar is formed a hiatus, o.

Upon shaft H is loosely mounted a second arm, h², that is operated from the eccentric-rod H² and larger eccentric, H⁴. Upon the said arm h² is pivoted a spring-actuated pawl, h⁴, that rides upon the collar O' until it reaches the hiatus o therein, when said pawl, under the stress of its spring, drops into engagement with the teeth of the ratchet-wheel P, rigidly secured to shaft H, and carries said ratchet-wheel around with it. As the ratchet-wheel O continues its rotation, the pawl h⁴ is again disengaged from the teeth of the ratchet-wheel P, and rides on collar O' until it has traveled around to bring the hiatus o thereof in position to allow the pawl h⁴ to again drop into engagement with the ratchet-wheel P.

The throw of the eccentric-rod H², as stated above, is greater than that of the rod H', so as to impart a sufficient turn to the ratchet-wheel P. However, the proportionate sizes of the eccentrics may be varied to suit the circumstances. It will thus be seen that the ratchet-wheel P drives the shaft H intermittingly, and the intermittent rotation of the latter is communicated to the shaft F' through the gearing G' G, and through shaft F' an intermitting movement is imparted to the chain of pans B.

The relative arrangement of the ratchets O P and their operating mechanism is such that the intermission in the movement of the pans occurs at a time when the lids of said pans are thrown open, as shown in Figs. 1 and 2, and the duration of this intermission in the movement of the chain of pans is such as to allow time for the open pans to be emptied and refilled before they pass on and are closed up again. This method of driving is preferred for general purposes; but it is sometimes desirable to have a slow continuous movement of the forms, and in such case the ratchet movement is dispensed with and any suitable form of slow-driving mechanism adopted, such as ordinary spur-gearing moving slowly.

The operation of unlocking the pan-lids, of throwing said lids open, of reclosing and locking the same to the pans is effected automatically by the following instrumentalities:

K K are guide-rails, forming between them a narrow guide-slot, said rails or bars extending from the rear end of the machine over its top, from one side of the frame toward the other and back again, as more plainly shown in Fig. 2. At the initial or rear end of the guide-track K K the rails are slightly spread and lie in the path of the lugs b⁴, that project from the end of the locking-straps b² of the pan-lids B². From the rail E projects a tooth or lug, E³, Figs. 7 and 10, the said tooth lying in the path of the star-wheels B⁴, on the locking-bolts B³ of the pan-carriages. This tooth or lug E³ is located at the initial or rear end of the guide-slot, formed by the rails K K, and as the lug b⁴ on the lid-strap b² enters into the slot between said rails K K the tooth E³ engages the teeth on the star-wheel B⁴, and imparts to the locking-bolt B³ one-half of a revolution. This movement of the bolt places the T-head b× thereof on a line with the slot b³ of the lid-strap, and as the pans continue their movement the lug b⁴ on the lid-strap being guided by the slot between the rails K K, said lid is gradually thrown open, as shown in Figs. 1 and 2. The arrangement of the rails K K is such that the lids of two pans will be open simultaneously—one attendant emptying a pan and the other filling it—the movement of the chain of pans being arrested a sufficiently long time to effect this, as above described. As the baking-pans travel along the track E toward the front of the machine, the lids B² thereof are closed, and as the lug b⁴ of the locking-strap b² of said lids leave the guide-slot between the rails K K a second lug, E², that projects from the track E, again engages the teeth of the star-wheel B⁴, and imparts to it one-half a revolution, whereby the locking-bolt B³ is rotated to bring the T or cross head b× thereof across the upper face of the slot b³ in the locking-strap of the lid B² and lock the latter securely in position. In this manner the pans as they successively pass along the guides K K have their lids automatically opened and closed again, thereby saving a great deal of labor and time.

The machine is supplied with the necessary heat by the following instrumentalities:

L and L' are tubes which conduct gas and air to the burners M, and Q is the pipe through which the gases and products of combustion are exhausted.

Having thus described my said invention, what I claim, and desire to secure by Letters Patent, is—

1. In a machine of the class described, an endless chain of baking pans or forms having a progressive movement in one direction, a lid for said pans, and a revoluble locking-bolt for locking said lid to the pans, in combination with a fixed stud or stop for operating the locking-bolt to automatically unlock said lid as each pan reaches a given point in its progressive movement, substantially as and for the purpose specified.

2. In a machine of the class described, an endless chain of baking pans or forms having a progressive movement in one direction, a lid for said pans, and a revoluble locking-bolt for locking said lid to the pan, in combination with a fixed stud or stop for operating the locking-bolt to automatically unlock said lid as each pan reaches a given point in its progressive movement, and a fixed guide operating on the lid to automatically throw it open after it has been unlocked, substantially as and for the purpose specified.

3. In a machine of the class described, an endless chain of baking pans or forms having a progressive movement in one direction, a lid for said pans, and a revoluble locking-bolt for locking said lid to the pan, in combination with a fixed stud or stop for operating the locking-bolt to automatically unlock said lid as each pan reaches a given point in its progressive movement, and a fixed guide operating on the pan-lid to automatically throw it open, hold the same in open position for a period of time, and then automatically close the lid again, substantially as and for the purpose specified.

4. In a machine of the class described, an endless chain of baking pans or forms having a progressive movement in one direction, a lid for said pans, and a revoluble locking-bolt for locking said lid to the pan, in combination with a fixed stud or stop for operating the locking-bolt to automatically unlock the lid as each pan reaches a given point in its progressive movement, a fixed guide operating on the lid to automatically throw it open, hold the same in an open position for a period of time, then close the lid again, and a second fixed stud or stop operating on the locking-bolt to again lock the lid to the pan, substantially as and for the purpose specified.

5. In a machine of the class described, the combination, with an endless chain of pans, an endless track on which said chain of pans travels, a driving-shaft for propelling the chain of pans along the track, and heating devices for heating the pans, of a ratchet-and-pawl mechanism constructed and operating to impart to the driving-shaft an intermitting rotation, substantially as and for the purpose specified.

6. In a machine of the class described, the combination, with an endless chain of pans, a revoluble locking-bolt for the lid of said pans, and endless track upon which the chain of pans travels, a driving-shaft for propelling the chain of pans along the track, and heating devices to heat the pans, of a ratchet-and-pawl mechanism constructed and operating to impart to the driving-shaft an intermitting rotation, and a fixed stud or stop operating on the locking-bolt to unlock the pan-lids when the pans reach a given point on the track, substantially as and for the purposes specified.

7. In a machine of the class described, the combination, with an endless chain of baking-pans, a revoluble locking-bolt for the lid of said pans, an endless track upon which the chain of pans travels, a driving-shaft for propelling the chain of pans along the track, and heating devices for heating the pans, of a ratchet-and-pawl mechanism constructed and operating to impart to the shaft an intermitting rotation, a fixed stud or stop operating on the locking-bolt to unlock the pan-lids when the pans reach a given point on the track, and a guide engaging the pan-lids to throw the same open, substantially as and for the purposes specified.

8. In a machine of the class described, the combination, with an endless chain of baking-pans, a revoluble locking bolt for the lid of said pans, an endless track upon which the chain of pans travels, a driving-shaft for propelling the chain of pans along the track, and heating devices for heating the pans, of a ratchet-and-pawl mechanism constructed and operating to impart to the shaft an intermitting rotation, a fixed stud or stop operating on the locking-bolt to unlock the pan-lids when the pans reach a given point on the track, and a guide engaging the pan-lids to throw the same open and hold them in an open position for a period of time and then close said lids, substantially as and for the purpose specified.

9. In a machine of the class described, the combination, with an endless chain of baking-pans, a revoluble locking bolt for the lid of said pans, an endless track upon which the chain of pans travels, a driving-shaft for propelling the chain of pans along the track, and heating devices for heating the pans, of a ratchet-and-pawl mechanism constructed and operating to impart to the shaft an intermitting rotation, a fixed stud or stop operating on the locking-bolt to unlock the pan-lids when the pans reach a given point on the track, a guide engaging the pan-lids to throw the same open and hold them in an open position for a period of time and then close said lids, and a second fixed stop operating on the revoluble locking bolts to relock the lids to the pans, substantially as and for the purpose specified.

10. In a machine of the class described, the combination, with the endless chain of pans B and the shaft F', carrying chain or pitch wheels F and the gear-wheel G, and the main driving-shaft I, carrying eccentrics $H^3$ $H^4$, of the shaft H, carrying gear-wheel G', the ratchet-wheel O, provided with the ring-shoulder O', the ratchet-wheel P within said ring-shoulder, the actuating-pawls $h^3$ $h^4$, pawl-arms $h'$ $h^2$, and connecting-rods H' $H^2$, said parts being arranged for operation, substantially as and for the purpose specified.

In testimony whereof I have hereunto set my hand in the presence of the two subscribing witnesses.

GEORGE SAMUEL BAKER.

Witnesses:
　ALFRED J. BOULT,
　H. B. BRIDGE.